US009344498B2

(12) United States Patent
Clayton et al.

(10) Patent No.: US 9,344,498 B2
(45) Date of Patent: May 17, 2016

(54) POLICY-BASED MANAGEMENT OF STORAGE FUNCTIONS IN DATA REPLICATION ENVIRONMENTS (71) Applicant: International Business Machines Corporation, Armonk, NY (US)

(72) Inventors: Nicolas M. Clayton, Warrington (GB); Lisa J. Gundy, Tucson, AZ (US); John R. Paveza, Morgan Hill, CA (US); Beth A. Peterson, Tucson, AZ (US); Alfred E. Sanchez, Tucson, AZ (US); David M. Shackelford, Tucson, AZ (US); Warren K. Stanley, Loveland, CO (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/616,669

(22) Filed: Feb. 7, 2015

(65) Prior Publication Data
US 2015/0156263 A1 Jun. 4, 2015

Related U.S. Application Data (63) Continuation of application No. 13/420,621, filed on Mar. 15, 2012, now Pat. No. 8,990,263.

(51) Int. Cl.
*G06F 17/30* (2006.01)
*H04L 29/08* (2006.01)
(Continued)

(52) U.S. Cl.
CPC ........ *H04L 67/1095* (2013.01); *G06F 11/2071* (2013.01); *G06F 11/3034* (2013.01);
(Continued)

(58) Field of Classification Search
None
See application file for complete search history.

(56) References Cited

U.S. PATENT DOCUMENTS

| 6,338,114 B1 | 1/2002 | Paulsen et al. |
| 6,557,089 B1 | 4/2003 | Reed et al. |

(Continued)

FOREIGN PATENT DOCUMENTS

| JP | 2002259189 A | 9/2002 |
| JP | 2011048549 A | 3/2011 |
| JP | 2011170742 A | 9/2011 |

OTHER PUBLICATIONS

PCT International Search Report and Written Opinion, International App. No. PCT/JP2013/001297, Apr. 9, 2013.

*Primary Examiner* — Debbie Le
(74) *Attorney, Agent, or Firm* — Nelson and Nelson; Daniel P. Nelson; Alexis V. Nelson (57) ABSTRACT A method for managing storage functions in a data replication environment is disclosed. In one embodiment, such a method includes continually monitoring for changes to a storage configuration at a secondary site. Upon detecting changes to the storage configuration at the secondary site, the method transmits remote metadata describing the changes to the primary site and stores the remote metadata at the primary site. The method then initiates a storage management function at the primary site which is mirrored to the secondary site. In order to perform the storage management function, the method reads the remote metadata at the primary site to determine the storage configuration at the secondary site. The method then performs the storage management function at the primary site in a way that takes into account the storage configuration at the secondary site. A corresponding apparatus, system, and computer-readable medium are also disclosed and claimed herein.

7 Claims, 6 Drawing Sheets (51) Int. Cl.
    *G06F 11/20*   (2006.01)
    *G06F 11/30*   (2006.01)
    *H04L 12/26*   (2006.01)
    *G06F 11/14*   (2006.01)

(52) U.S. Cl.
    CPC ...... *G06F11/3051* (2013.01); *G06F 17/30873* (2013.01); *H04L 43/08* (2013.01); *H04L 67/1097* (2013.01); *G06F 11/1456* (2013.01); *G06F 2201/82* (2013.01)

(56) References Cited

U.S. PATENT DOCUMENTS

| | | | |
|---|---|---|---|
| 6,564,307 B1 | 5/2003 | Micka et al. | |
| 6,611,901 B1 | 8/2003 | Micka et al. | |
| 7,054,960 B1 * | 5/2006 | Bezbaruah | G06F 11/2071 710/33 |
| 7,313,662 B2 | 12/2007 | Nishikawa et al. | |
| 7,353,259 B1 | 4/2008 | Bakke et al. | |
| 7,409,510 B2 | 8/2008 | Werner et al. | |
| 7,457,826 B2 | 11/2008 | Hudis et al. | |
| 7,680,957 B1 | 3/2010 | Ketterhagen et al. | |
| 7,774,096 B2 | 8/2010 | Goerg et al. | |
| 7,849,278 B2 | 12/2010 | Sato et al. | |
| 8,015,383 B2 | 9/2011 | Shultz et al. | |
| 8,990,263 B2 * | 3/2015 | Clayton | G06F 11/2071 707/781 |
| 8,990,264 B2 * | 3/2015 | Clayton | G06F 11/2071 707/781 |
| 2005/0240928 A1 | 10/2005 | Brown et al. | |
| 2006/0047713 A1 | 3/2006 | Gornshtein et al. | |
| 2007/0255762 A1 | 11/2007 | Martin, Jr. et al. | |
| 2007/0288710 A1 * | 12/2007 | Boyd | G06F 11/2069 711/162 |
| 2008/0235357 A1 | 9/2008 | Gustafsson | |
| 2009/0049328 A1 | 2/2009 | Hattori | |
| 2009/0327295 A1 | 12/2009 | Bovee et al. | |
| 2011/0251001 A1 * | 10/2011 | Kobayashi | F16H 7/0848 474/110 |

* cited by examiner

POLICY-BASED MANAGEMENT OF STORAGE FUNCTIONS IN DATA REPLICATION ENVIRONMENTS

BACKGROUND

1. Field of the Invention

This invention relates to data replication environments, and more particularly to systems and methods for managing storage functions in data replication environments.

2. Background of the Invention

In data replication environments such as Peer-to-Peer-Remote-Copy ("PPRC") or Extended-Remote-Copy ("XRC") environments, data is mirrored from a primary storage device to a secondary storage device to maintain two consistent copies of the data. The primary and secondary storage devices may be located at different sites, perhaps hundreds or even thousands of miles away from one another. In the event the primary storage device fails, I/O may be redirected to the secondary storage device, thereby enabling continuous operations. When the primary storage device is repaired, I/O may resume to the primary storage device.

When managing storage at a primary site, care needs to be taken to ensure that any operations (i.e., storage functions) initiated at the primary site can be successfully mirrored to the secondary site. For example, when a target volume is allocated at the primary site to receive a point-in-time copy (using the FlashCopy function, for example), care needs to be taken to ensure that a corresponding target volume at the secondary site can receive a point-in-time copy. For example, if a point-in-time copy function requires that both source volume and target volume reside on the same storage system and a point-in-time-copy operation is initiated at the primary site for a source volume and target volume that satisfy this requirement, techniques are needed to verify that the corresponding source volume and target volume at the secondary site also satisfy this requirement. In order to make this determination at the primary site, information is needed about the storage configuration at the secondary site. Such information may not be readily available at the primary site, or may be difficult to access from the primary site without degrading performance.

In view of the foregoing, what are needed are systems and methods to make remote storage configuration information available at a primary site in order to effectively manage storage functions that are mirrored to a secondary site. Such systems and methods would ideally enable policy-based decisions at a primary site that take into account the storage configuration at a secondary site.

SUMMARY

The invention has been developed in response to the present state of the art and, in particular, in response to the problems and needs in the art that have not yet been fully solved by currently available systems and methods. Accordingly, the invention has been developed to provide systems and methods to manage storage functions in a data replication environment. The features and advantages of the invention will become more fully apparent from the following description and appended claims, or may be learned by practice of the invention as set forth hereinafter.

Consistent with the foregoing, a method for managing storage functions in a data replication environment is disclosed herein. In one embodiment, such a method includes continually monitoring for changes to a storage configuration at a secondary site. Upon detecting changes to the storage configuration at the secondary site, the method transmits remote metadata describing the changes to the primary site and stores the remote metadata at the primary site. The method may then initiate a storage management function at the primary site which is mirrored to the secondary site. In order to perform the storage management function, the method reads the remote metadata at the primary site to determine the storage configuration at the secondary site. The method may then perform the storage management function at the primary site in a way that takes into account the storage configuration at the secondary site.

A corresponding apparatus, system, and computer-readable medium are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-readable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
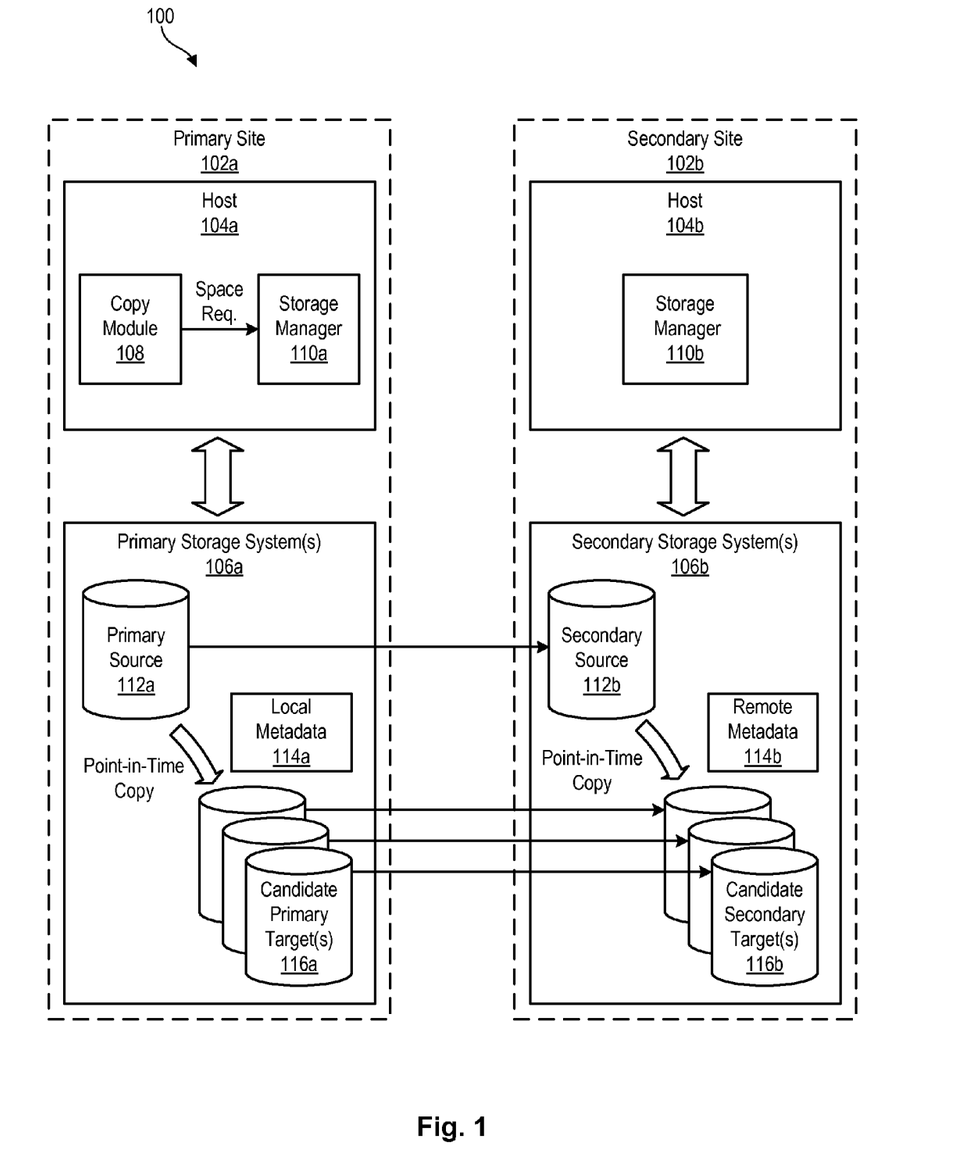
FIG. 1 is a high-level block diagram showing one example of a data replication environment, such as an XRC environment.

Referring to FIG. 1, one embodiment of a data replication system 100 is illustrated. In certain embodiments, the data replication system 100 is an asynchronous data replication system 100, such as IBM's Extended Remote Copy (XRC), although the systems and methods disclosed herein could be extended to other types of asynchronous and synchronous data replication systems. As shown, the data replication system 100 includes various components located at a primary site 102a and a secondary site 102b. The primary site 102a may include components that serve as a primary production system whereas the secondary site 102b may include components that back up the components at the primary site 102a. In the event a failure occurs at the primary site 102a, I/O may be redirected to the secondary site 102b, thereby enabling continuous operations. When the failure at the primary site 102a is repaired, I/O may resume to the primary site 102a. The process of redirecting I/O from the primary site 102a to the secondary site 102b may be referred to as a "failover." The process of redirecting I/O to the primary site 102a may be referred to as a "failback."

As shown, the primary site 102a includes a primary host system 104a and one or more primary storage systems 106a. The secondary site 102b includes a secondary host system 104b and one or more secondary storage systems 106b. In an XRC environment, data is asynchronously mirrored from one or more volumes on the primary storage systems 106a to one or more volumes on the secondary storage systems 106b. A storage manager 110a (e.g., DFSMS) at the primary site 102a may manage volumes on the primary storage systems 106a. Similarly, a storage manager 110b (e.g., DFSMS) at the secondary site 102b may manage volumes on the secondary storage systems 106b. The storage manager 110b at the secondary site 102b may include functionality to mirror (i.e., copy) data from the primary volumes 112a, 116a to the secondary volumes 112b, 116b, as occurs in XRC systems. To accomplish this, the storage manager 110b at the secondary site 102b may be connected in such a way that it has access to both the primary and secondary storage systems 106a, 106b.

In some cases, certain storage functions initiated at the primary site 102a may need to be mirrored (i.e., duplicated) to the secondary site 102b. For example, a point-in-time-copy operation performed at the primary site 102a may need to be duplicated at the secondary site 102b to provide data consistency. To accomplish this, the storage manager 110a may need to verify that the storage function can be successfully duplicated at the secondary site 102b prior to initiating the storage function.

In certain embodiments, a copy module 108 (implementing a point-in-time-copy function such as FlashCopy) may be configured to initiate a point-in-time-copy function at the primary site 102a by submitting a space request to the storage manager 110a. The storage manager 110a may, in turn, identify one or more candidate primary target volumes 116a that can receive the point-in-time copy. These may include target volumes 116a that are in the same storage system as the source volume 112a and/or are part of the same mirror (i.e., consistency group) as the source volume 112a. The storage manager 110a may identify the candidate target volumes 116a by analyzing local metadata 114a that describes the software and hardware configuration of the primary storage systems 106a.

In addition to finding eligible candidate target volumes 116a at the primary site 102a, the storage manager 110a needs to verify that any point-in-time-copy operation that is performed at the primary site 102a can be duplicated at the secondary site 102b. To accomplish this, the storage manager 110a needs to verify that the identified candidate primary target volumes 116a have corresponding secondary target volume 116b that can participate in the point-in-time-copy operation. For example, the storage manager 110a may need to verify that any secondary target volumes 116a that participate in the point-in-time-copy operation are in the same storage system as the secondary source volume 112*b* and/or are part of the same mirror as the secondary source volume 112*b*.

The storage manager 110*a* could make this determination by querying the secondary site 102*b* for remote metadata 114*b* that describes the remote storage configuration. However, this approach may suffer a performance penalty for each query that is proportional to the round-trip distance between the primary site 102*a* and the secondary site 102*b*. Furthermore, a query may need to be processed for each candidate volume 116*a* for each requested point-in-time-copy operation. Thus, if there are N requested point-in-time-copy operations, K candidate volumes 116*a*, and a round-trip distance of d, a delay of at least 2×d×N×K may result. This approach may also have the drawback that some information about the remote storage configuration may not be accessible by query.

Alternatively, the remote storage configuration (i.e., remote metadata 114*b*) could be stored in a file at the primary site 102*a*. This could enable the storage manager 110*a* to make decisions that consider the remote metadata 114*b* simply by reading and analyzing the local file. However, the data in the file could quickly become out-of-date as storage configuration changes are made at the secondary site 102*b*. Making decisions based on out-of-date remote metadata 114*b* could destroy data or produce inconsistent data at the secondary site 102*b*. For example, performing point-in-time-copy operations at the primary site 102*a* that cannot be duplicated at the secondary site 102*b* will produce inconsistent data.

Figure 2:
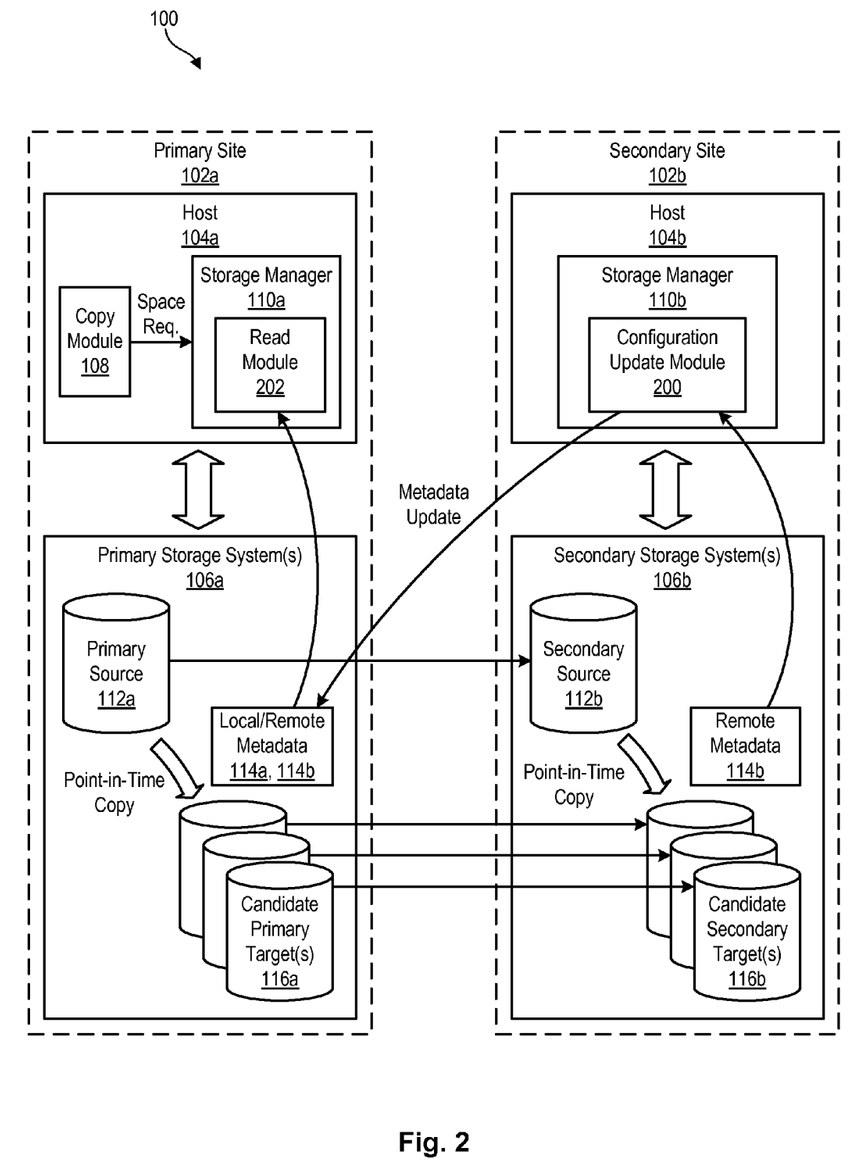
FIG. 2 is a high-level block diagram showing a configuration update module and read module for making remote metadata available at a primary site.

Referring to FIG. 2, in certain embodiments in accordance with the invention, a configuration update module 200 may be provided at the secondary site 102*b* to make remote metadata 114*b* available at the primary site 102*a*. In certain embodiments, the configuration update module 200 is a component of the storage manager 110*b* since the storage manager 110*b* may be configured to access both the primary and secondary storage systems 106*a*, 106*b*. Alternatively, the configuration update module 200 could be implemented as a separate module. The configuration update module 200 may be configured to continually monitor for changes to the storage configuration at the secondary site 102*b*. Upon detecting changes to the storage configuration, the configuration update module 200 may read the remote metadata 114*b* from the secondary storage system 106*b* and write the remote metadata 114*b* to the primary storage system 106*a*.

In certain embodiments, space is reserved in the memory of the primary storage system 106*a* to store the remote metadata 114*b*. In certain embodiments, the space is reserved in both volatile memory (e.g., cache) and persistent memory (non-volatile storage, or "NVS") of the primary storage system 106*a*. The cache and NVS will be described in more detail in association with FIG. 6. The memory in the primary storage system 106*a* may also store local metadata 114*a* describing the storage configuration of the primary storage system 106*a*. Upon detecting changes to the remote metadata 114*b*, the configuration update module 200 may write the remote metadata 114*b* to the reserved space on the primary storage system 106*a* using, for example, a special update command. In this way, the remote metadata 114*b* describing the remote storage configuration is continually kept up-to-date at the primary site 102*a*.

Each time the local or remote metadata 114*a*, 114*b* is updated on the primary storage system 106*a*, a message may be sent to the primary host system 104*a* to notify the primary host system 104*a* that the storage configuration has changed. A read module 202 in or associated with the host system 104*a* may then read the remote metadata 114*b* and store it in commonly accessible memory of the primary host system 104*a*.

Once this metadata is read into commonly accessible memory on the host system 104, it may be quickly and efficiently accessed by applications running on the host system 104*a*, since this eliminates the need to query the primary storage system 106*a* each time the local or remote metadata 114*a*, 114*b* is needed. The local and remote metadata 114*a*, 114*b* may be used by the storage manager 110*a* to make policy-based decisions that affect both the primary and secondary sites 102*a*, 102*b*. For example, when selecting target volumes 116*a* to receive point-in-time copies, the storage manager 110*a* may select target volumes 116*a* based not only on the local storage configuration, but also on the remote storage configuration.

Figure 3:
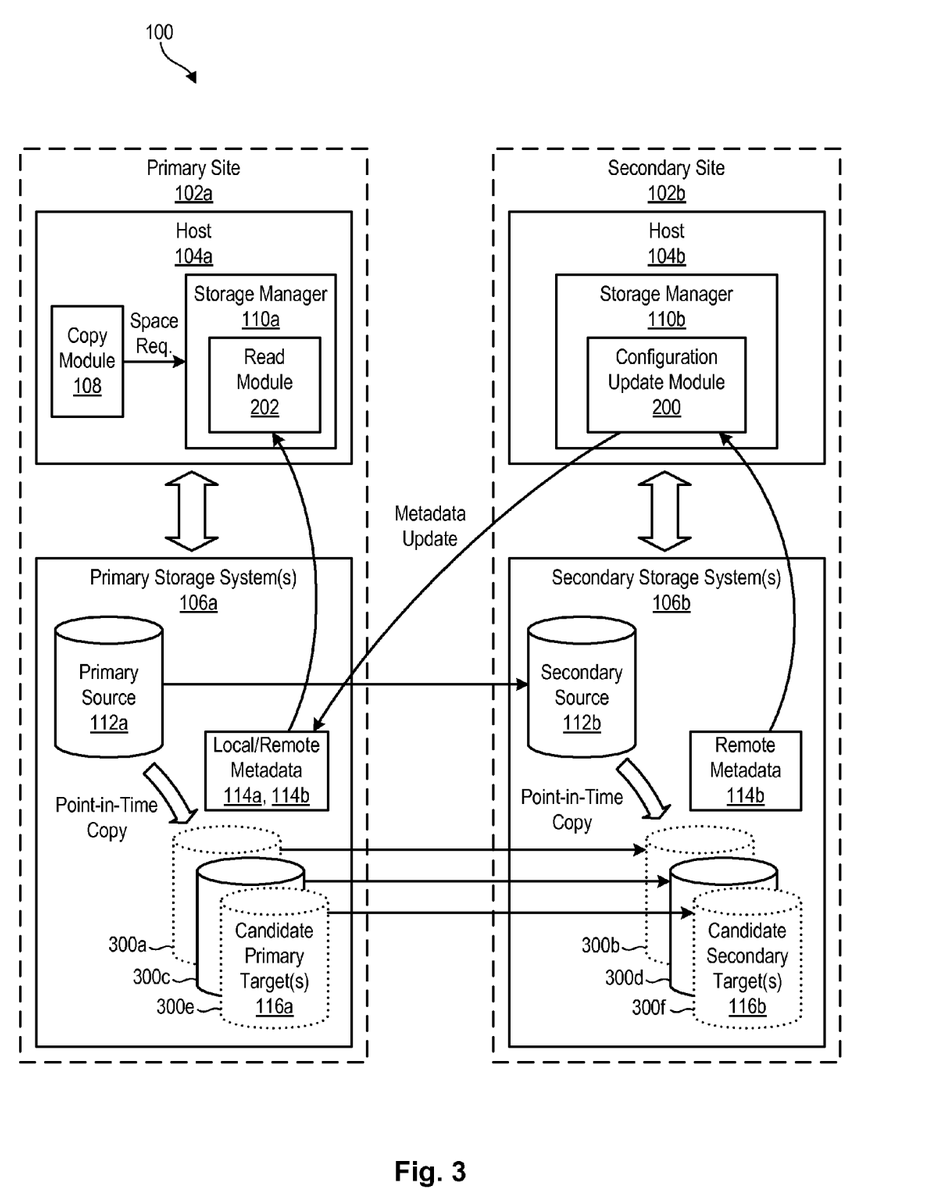
FIG. 3 is a high-level block diagram showing how a storage manager at the primary site may use the remote metadata to make storage management decisions.

For example, referring to FIG. 3, assume that the target volumes 300*a*, 300*c*, 300*e* on the primary storage systems 106*a* are each candidates to be the target of a point-in-time-copy operation. Each of these target volumes 300*a*, 300*c*, 300*e* have a mirroring relationship with corresponding target volumes 300*b*, 300*d*, 300*f* on the secondary storage systems 106*b*. Some of the target volumes 300*b*, 300*f* on the secondary storage systems 106*b* may not be eligible to receive a point-in-time copy from a source volume 112*b*. For example, some of the target volumes 300*b*, 300*f* may reside on different storage systems 106*b* than the secondary source volume 112*b* and/or belong to different consistency groups than the source volume 112*b*.

By making the remote metadata 114*b* available to the storage manager 110*a* at the primary site 102*a*, the storage manager 110*a* will be able to determine which pairs of target volumes 116*b* at the primary site 102*a* and secondary site 102*b* are eligible to participate in the point-in-time-copy operation. For example, as illustrated in FIG. 3, by examining both the local and remote metadata 114*a*, 114*b*, the storage manager 110*a* may determine that only target volume 300*c*, at the primary site 102*a*, and corresponding target volume 300*d*, at the secondary site 102*b*, are valid candidates to participate in the point-in-time-copy operation with corresponding source volumes 112*a*, 112*b*.

The techniques illustrated in FIGS. 2 and 3 allow the storage manager 110*a* to have more complete configuration information in order to make policy decisions, without suffering the performance degradation associated with directly querying the secondary site 102*b*, and without the inaccuracies inherent in relying on manual processes. More specifically, consolidating the remote metadata 114*b* in commonly accessible storage on the primary host system 104*a* may reduce the access time from milliseconds (to query the secondary site 102*b*) to microseconds (to read the commonly accessible storage on the host system 104*a*).

Figure 4:
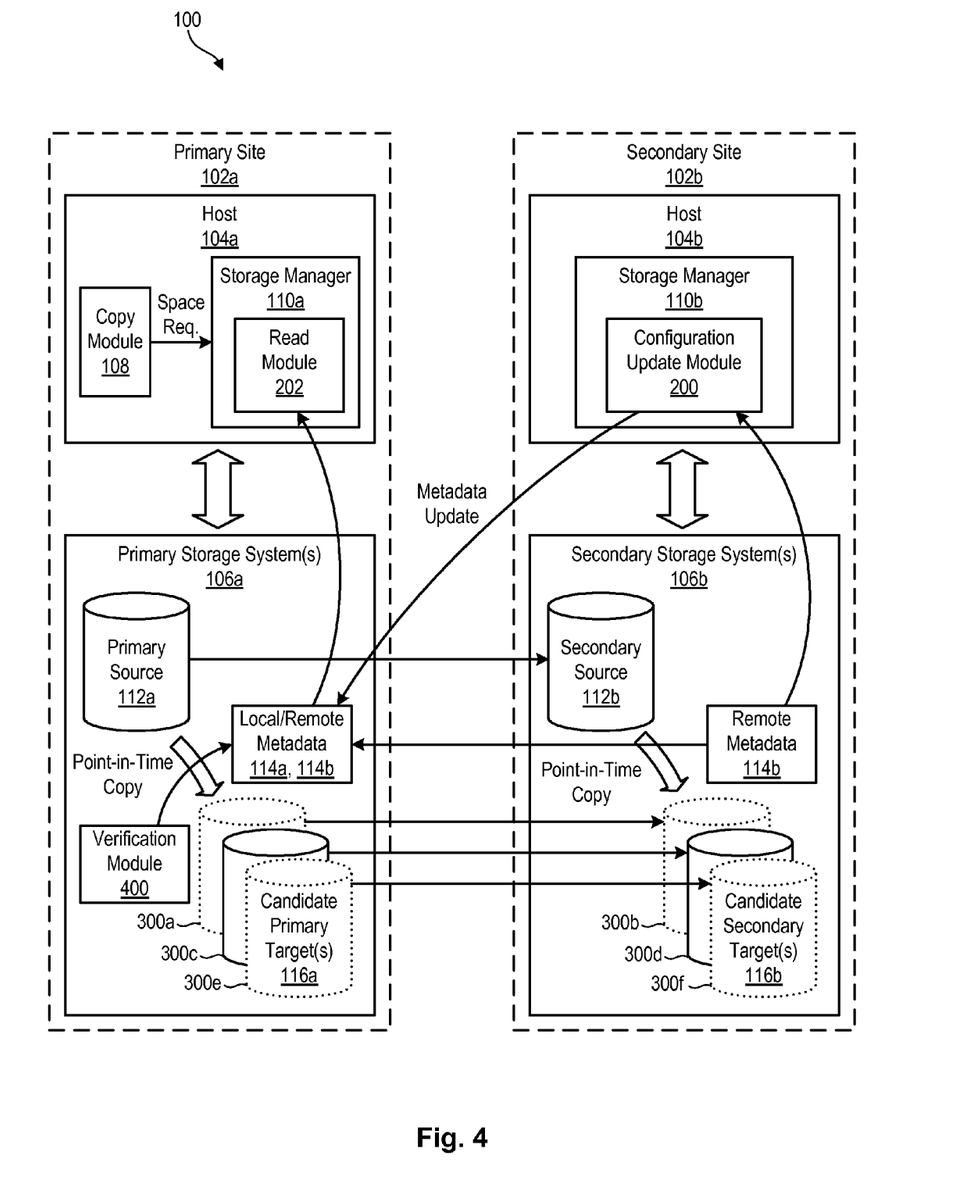
FIG. 4 is a high-level block diagram showing a verification module to verify, at allocation time, that remote volumes are still eligible to participate in a requested storage function.

Referring to FIG. 4, in many cases, a significant amount of time may pass between the time the storage manager 110*a* selects the target volumes 300*c*, 300*d* and the time the target volumes 300*c*, 300*d* are actually allocated to receive point-in-time copies. During this time period, the storage configuration at the primary site 102*a* or secondary site 102*b* may change in a way that makes the target volumes 300*c*, 300*d* ineligible to participate in the point-in-time copy operation.

In certain embodiments, a verification module 400 may be provided in the storage controller 106*a* to verify that a pair of target volumes 300*c*, 300*d* selected by the storage manager 110*a* is still eligible to participate in a point-in-time-copy operation at the time the allocation is performed. The verification module 400 may perform this verification using the local and remote metadata 114*a*, 114*b* stored on the primary storage system 106*a*. This may provide a last-chance mechanism to reject a requested point-in-time-copy operation if the storage configuration has changed since the storage manager 110*a* made its allocation decision. If the point-in-time-copy operation is rejected, the storage manager 110*a* may re-analyze the local and remote metadata 114*a*, 114*d* located at the primary site 102*a* to find a new pair of eligible target volumes 116*a*, 116*b*.

Figure 5:
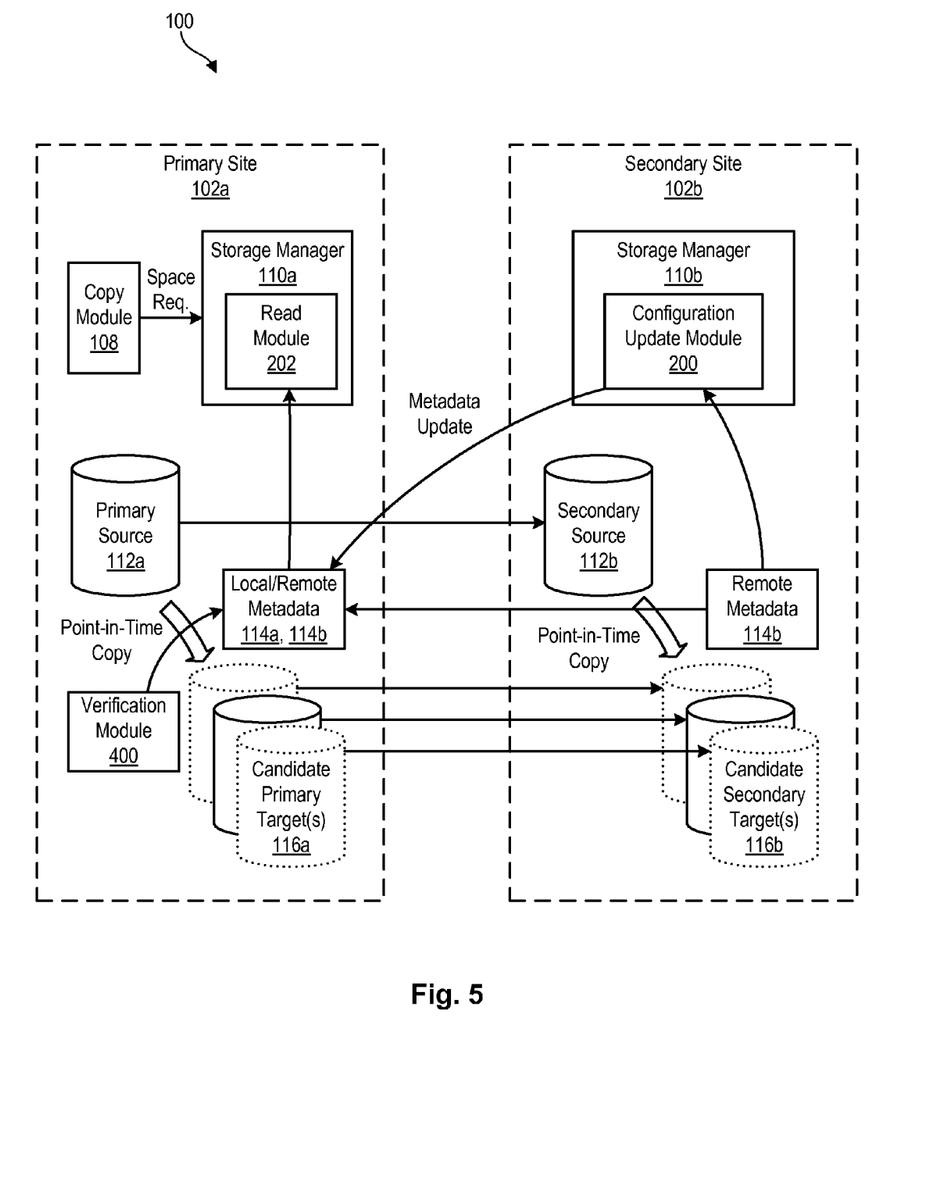
FIG. 5 is a high-level block diagram showing a more general system in accordance with the invention.

Referring to FIG. 5, various features or functions described in association with FIGS. 1 through 4 have been shown to be implemented in specific hardware components, such as specific host systems and storage systems. However, the features or functions are not limited to implementation in the illustrated hardware components. For example, some features and functions (i.e., features or functions of the copy module 108, storage managers 110*a*, 110*b*, configuration update module 200, read module 202, and verification module 400) shown in the host systems 104*a*, 104*b* may be implemented in the storage systems 106*a*, 106*b* or distributed across the host systems 104*a*, 104*b* and storage systems 106*a*, 106*b*. Other features or functions shown in the storage systems 106*a*, 106*b* may be implemented in the host systems 104*a*, 104*b* or distributed across the host systems 104*a*, 104*b* and storage systems 106*a*, 106*b*.

Similarly, certain features or functionality shown at a primary site 102*a* may be implemented at a secondary site 102*b*, and vice versa. Thus, the described features or functions do not necessarily need to be implemented at the locations where they are illustrated. Data replication systems 100 may be designed in various different ways and the disclosed features and functions may be implemented in different ways and in different locations depending on the design. FIG. 5 shows various modules and components without tying them to specific hardware components.

Although particular reference has been made herein to mirroring point-in-time copies from a primary site 102*a* to a secondary site 102*b*, the systems and methods disclosed herein are not limited to point-in-time-copy functions. The systems and methods disclosed herein are applicable to a wide variety of different storage functions that may need to be mirrored from a primary site 102*a* to a secondary site 102*b*, or storage functions performed at a primary site 102*a* that need to consider the storage configuration at a secondary site 102*b*. In any such cases, the systems and methods disclosed herein may be used to make remote metadata 114*b* available at a primary site 102*a*. Thus, the systems and methods disclosed herein may be applicable to a wide variety of different storage functions and not just point-in-time copies.

Figure 6:
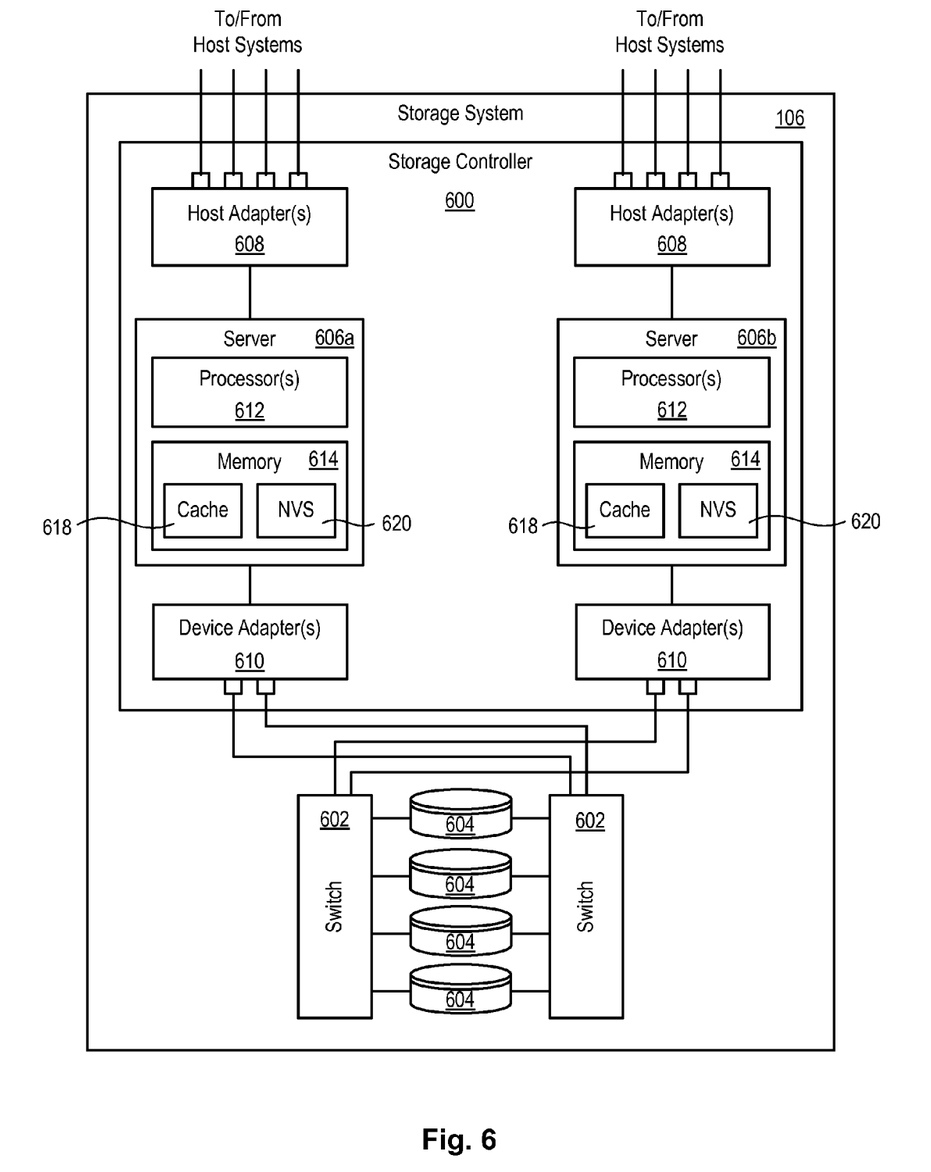
FIG. 6 is a high-level block diagram showing one example of a storage system for use as a primary or secondary storage system.

Referring to FIG. 6, one embodiment of a storage system 106 containing an array of storage drives 604 (e.g., hard-disk drives and/or solid-state drives) is illustrated. The internal components of the storage system 106 are shown since various features and functions in accordance with the invention may be implemented within such a storage system 106, although the features and functions may also be applicable to other storage systems. As shown, the storage system 106 includes a storage controller 600, one or more switches 602, and one or more storage drives 604 such as hard disk drives and/or solid-state drives (such as flash-memory-based drives). The storage controller 600 may enable one or more hosts 104 (e.g., open system and/or mainframe servers 104) to access data in the one or more storage drives 604.

In selected embodiments, the storage controller 600 includes one or more servers 606. The storage controller 600 may also include host adapters 608 and device adapters 610 to connect the storage controller 600 to host devices 104 and storage drives 604, respectively. Multiple servers 606*a*, 606*b* provide redundancy to ensure that data is always available to connected hosts 104. Thus, when one server 606*a* fails, the other server 606*b* may pick up the I/O load of the failed server 606*a* to ensure that I/O is able to continue between the hosts 104 and the storage drives 604. This process may be referred to as a "failover."

In selected embodiments, each server 606 may include one or more processors 612 and memory 614. The memory 614 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 612 and are used to access data in the storage drives 604. The servers 606 may host at least one instance of these software modules. These software modules may manage all read and write requests to logical volumes in the storage drives 604.

In selected embodiments, the memory 614 includes a cache 618, such as a DRAM cache 618. Whenever a host 106 (e.g., an open system or mainframe server 106) performs a read operation, the server 606 that performs the read may fetch data from the storages drives 604 and save it in its cache 618 in the event it is required again. If the data is requested again by a host 104, the server 606 may fetch the data from the cache 618 instead of fetching it from the storage drives 604, saving both time and resources. Similarly, when a host 104 performs a write, the server 106 that receives the write request may store the write in its cache 618, and destage the write to the storage drives 604 at a later time. When a write is stored in cache 618, the write may also be stored in non-volatile storage (NVS) 620 of the opposite server 606 so that the write can be recovered by the opposite server 606 in the event the first server 606 fails.

As previously mentioned, in certain embodiments, the local and remote metadata 114*a*, 114*b* may be stored in the volatile and non-volatile memory 614 of the storage controller 600. For example, the local and remote metadata 114*a*, 114*b* may be stored in both the cache 618 and the non-volatile storage (NVS) 620. In the event the local and/or remote metadata 114*a*, 114*b* in cache 618 is lost (due to a failure or other event), the local and/or remote metadata 114*a*, 114*b* may be recovered from the NVS 620.

One example of a storage system 106 having an architecture similar to that illustrated in FIG. 6 is the IBM DS8000™ enterprise storage system. The DS8000™ is a high-performance, high-capacity storage controller providing disk and solid-state storage that is designed to support continuous operations. Nevertheless, the methods disclosed herein are not limited to the IBM DS8000™ enterprise storage system 106, but may be implemented in any comparable or analogous storage system, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

The flowcharts and block diagrams in the Figures illustrate the architecture, functionality, and operation of possible implementations of systems, methods, and computer-readable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A system comprising:
a data replication system comprising a primary site and a secondary site, wherein production data is mirrored from the primary site to the secondary site;
a secondary host system to perform the following:
continually monitor changes to a storage configuration at the secondary site;
upon detecting changes to the storage configuration at the secondary site, transmit remote metadata describing the changes to the primary site for storage at the primary site;
a primary host system to perform the following:
initiate a storage management function at the primary site that is replicated to the secondary site;
read the remote metadata at the primary site to determine the storage configuration at the secondary site; and
perform the storage management function at the primary site in a way that takes into account the storage configuration at the secondary site.

2. The system of claim 1, wherein the primary host system is further configured to read local metadata at the primary site to determine a storage configuration of the primary site.

3. The system of claim 1, wherein the primary host system is configured to perform the storage management function in a way that takes into account the storage configuration at the primary site in addition to the storage configuration at the secondary site.

4. The system of claim 1, wherein the storage management function is a point-in-time-copy function.

5. The system of claim 4, wherein the primary host system is configured to verify that a source and target associated with the point-in-time-copy function are located in a same storage system at the secondary site.

6. The system of claim 1, wherein the primary host system is configured to verify that a source at the secondary site and a target at the secondary site are part of a same consistency group.

7. The system of claim 1, wherein the secondary host system is configured to store the remote metadata on at least one of a storage system and a host system at the primary site.

* * * * *